(12) United States Patent
Shalom

(10) Patent No.: US 6,556,705 B1
(45) Date of Patent: Apr. 29, 2003

(54) SYSTEM AND METHOD FOR ALIGNING A LOCALLY-RECONSTRUCTED THREE-DIMENSIONAL OBJECT TO A GLOBAL COORDINATE SYSTEM USING PARTIALLY-DETECTED CONTROL POINTS

(75) Inventor: Tamir Shalom, Tel Aviv (IL)

(73) Assignee: Cogni Tens, Ltd., Ramat Hasharon (IL)

( * ) Notice: Subject to any disclaimer, the term of this patent is extended or adjusted under 35 U.S.C. 154(b) by 0 days.

(21) Appl. No.: 09/606,054

(22) Filed: Jun. 28, 2000

Related U.S. Application Data
(60) Provisional application No. 60/142,347, filed on Jun. 28, 1999.

(51) Int. Cl.[7] .................. G06K 9/00; G06T 15/00; G01C 3/14
(52) U.S. Cl. .................. 382/154; 382/294; 382/285; 345/419; 356/12
(58) Field of Search .................. 382/294, 154, 382/284, 295, 285, 286, 293; 345/427, 486, 419, 672, 679; 356/12

(56) References Cited

U.S. PATENT DOCUMENTS

| | | | | |
|---|---|---|---|---|
| 5,531,520 A | | 7/1996 | Grimson et al. ............. | 382/131 |
| 5,581,637 A | | 12/1996 | Cass et al. .................. | 382/284 |
| 5,963,664 A | * | 10/1999 | Kumar et al. ................ | 382/154 |
| 6,061,468 A | * | 5/2000 | Kang ......................... | 382/154 |
| 6,075,905 A | * | 6/2000 | Herman et al. ............. | 382/284 |
| 6,078,701 A | * | 6/2000 | Hus et al. .................... | 382/294 |
| 6,167,151 A | * | 12/2000 | Albeck et al. ............... | 382/154 |

* cited by examiner

*Primary Examiner*—Bhavesh Mehta
*Assistant Examiner*—Yosef Kassa
(74) *Attorney, Agent, or Firm*—Richard A. Jordan

(57) ABSTRACT

A system and method are described for aligning a locally-reconstructed three-dimensional object, whose local reconstruction is relative to a local coordinate system, to a global coordinate system by using pre-mapped control points which are projected onto one or more of the images that may be used to generate the local reconstruction. A system includes a control point information generator and an alignment generator. The control point information generator is configured to identify in at least image associated with a local reconstruction of the object a projection of at least one control point in the scene onto the at least one image, and generate local projected coordinate information indicating coordinates of the projection in the at least one image. The alignment information generator is configured to utilize the local projected coordinate information and mapping information relating to global coordinate information indicating coordinates of the at least one control point relative to the global coordinate system to generate alignment information relating a local coordinate system associated with the local reconstruction to the global coordinate system.

24 Claims, 4 Drawing Sheets

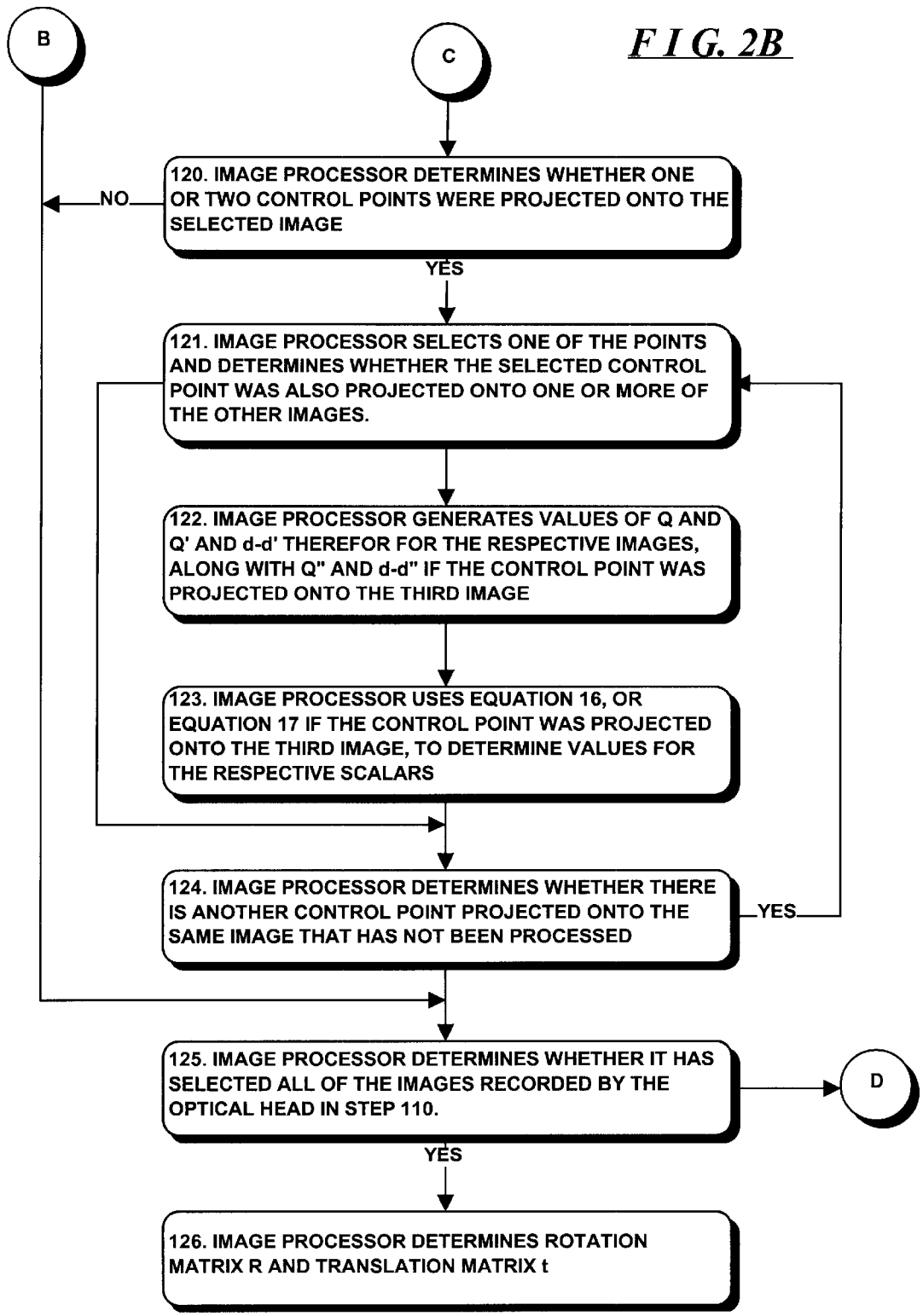

SYSTEM AND METHOD FOR ALIGNING A LOCALLY-RECONSTRUCTED THREE-DIMENSIONAL OBJECT TO A GLOBAL COORDINATE SYSTEM USING PARTIALLY-DETECTED CONTROL POINTS

This application claims continuing data of No. 60/142,347, Jun. 28, 1999.

FIELD OF THE INVENTION

This invention relates generally to the field of reconstructing and/or manipulating surface geometries of one or more three dimensional objects in a scene, from a plurality of two dimensional images of the scene, and more particularly to a system and method for relating a local coordinate system associated with a reconstruction of at least a portion of the scene to a global coordinate system.

BACKGROUND OF THE INVENTION

Reconstruction and/or manipulation (generally, "reconstruction") of surface features of three-dimensional object(s) in a scene, from a plurality of two-dimensional images of the object(s), is useful in a number of applications. U.S. patent application Ser. No. 08/989,047, filed Dec. 11, 1997, in the names of Dan Albeck et al., and entitled "Apparatus And Method For 3-Dimensional Surface Geometry Reconstruction," now U.S. Pat. No. 5,617,151, issued Dec. 26, 2000, (hereinafter referred to as the "Albeck application") describes an apparatus for performing such reconstruction using a rig including an optical head of three cameras, using a tensor arrangement described in U.S. patent application Ser. No. 08/497,224, filed Jun. 30, 1995, in the name of Amnon Shashua, and entitled "Apparatus And Method For Recreating And Manipulating A 3D Object Based On A 2D Projection Thereof" now U.S. Pat. No. 5,821,943, issued Oct. 13, 1998, (hereinafter referred to as the "Shashua application") to generate information regarding reconstruction for the features of the object(s) from three images generated by the cameras. In the arrangement described in the Shashua application, the surface features that are reconstructed are defined by points that have coordinates in a coordinate system relative to one of the cameras in the rig. A problem arises in reconstruction if the surface features that are to be reconstructed cannot all be recorded by all of the cameras with the rig in one position. The apparatus described in the Albeck application provides a mechanism for moving the rig so as to allow the cameras to record sets of images of various portions of the surface(s) of the object(s). However, when the rig moves from one location, in which the cameras record a set of images of one portion of the object(s), to another location, in which the cameras record another set of images of another portion of the object(s), the coordinate system for the points defining the surface features of the various portions of the object(s) also changes.

In order to utilize the reconstruction information generated in the two "local" coordinate systems in a unitary manner in connection with the object(s) in the scene, it is necessary to relate the local coordinate systems to a common global coordinate system, which will allow all of the points of the various portions of the reconstructed object(s) to be related to the global coordinate system, effectively "stitching" the reconstructions together. The global coordinate system can conveniently be one of the two local coordinate systems that were used in the reconstruction, or it can be a third coordinate system, but in any case all of the points for the various portions of the reconstructed object need to be related to the global coordinate system. When a rig, such as the rig described in the Albeck application is moved from one position to another, to facilitate recording of sets of images of different portions of the object(s), the movement comprises one or both of a translation and a rotation of the rig, both in three dimensions. If the translational and rotational movement of the rig can be controlled sufficiently precise, the relation of the coordinate system after movement to the coordinate system before movement can easily be determined. However, if, for example, the mass of the rig is sufficiently large, in a number of applications the movement of the rig cannot readily be controlled sufficiently precisely to allow sufficiently precise reconstruction.

U.S. patent application Ser. No. 09/165,687, filed Oct. 2, 1998, in the name of Tamir Shalom, et al., and entitled "System And Method For "Stitching" A Plurality Of Reconstructions Of Three-Dimensional Surface Features Of Object(s) In A Scene Defined Relative To Respective Coordinate Systems To Relate Them To A Common Coordinate System," now U.S. Pat. No. 6,201,541, issued Mar. 13, 2001, (hereinafter referred to as the Shalom application) describes an arrangement for relating a reconstruction of a portion of a scene to a global coordinate system. In the arrangement described in the Shalom application, a reconstruction of one portion of a scene is generated, which is related to the global coordinate system. Reconstructions of other portions can be related to the global coordinate system, but in the arrangement described in the Shalom application, the respective pairs of reconstructed portions will need to overlap with each other. That is, reconstructions successively displaced from the reconstruction which was originally related to the global coordinate systems will need to overlap, at least to some extent, with the overlapping portions providing information that is used to relate the local coordinate systems of the overlapping portions, thereby facilitating relation of the sequence of local coordinate systems to each other and, ultimately, to the global coordinate system. However, it will be appreciated that errors can develop in relating local coordinate systems of successive pairs of reconstructions, which can result in successively increasing errors in relating the local coordinate systems of the respective reconstructions to the global coordinate system. In addition, when the optical head is moved from one location to another to facilitate recording images from which the respective reconstructions are generated, the movement needs to be rigid, that is, the cameras need to maintain their respective orientations with respect to each other. If the optical head is not rigid, that is, if the cameras change their translational or rotational orientations with respect to each other, errors in relating the local coordinate systems of the respective pairs of reconstructions can also develop.

SUMMARY OF THE INVENTION

The invention provides a new and improved system and method for aligning a locally-reconstructed three-dimensional object to a global coordinate system using partially-detected control points.

In brief summary, the invention provides a system and method for aligning a locally-reconstructed three-dimensional object, whose local reconstruction is relative to a local coordinate system, to a global coordinate system by using pre-mapped control points which are projected onto one or more of the images that may be used to generate the local reconstruction. A system in accordance with the invention includes a control point information generator and an alignment generator. The control point information generator is configured to identify in at least image associated with a local reconstruction of said object a projection of at least one control point in the scene onto said at least one image, and generate local projected coordinate information indicating coordinates of said projection in said at least one image. The alignment information generator is configured to utilize said local projected coordinate information and mapping information relating to global coordinate information indicating coordinates of said at least one control point relative to said global coordinate system to generate alignment information relating a local coordinate system associated with said local reconstruction to said global coordinate system.

After the alignment information has been generated, the reconstruction in the local coordinate system can be aligned to the global coordinate system. This can be done with a plurality of local reconstructions, essentially stitching them together.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
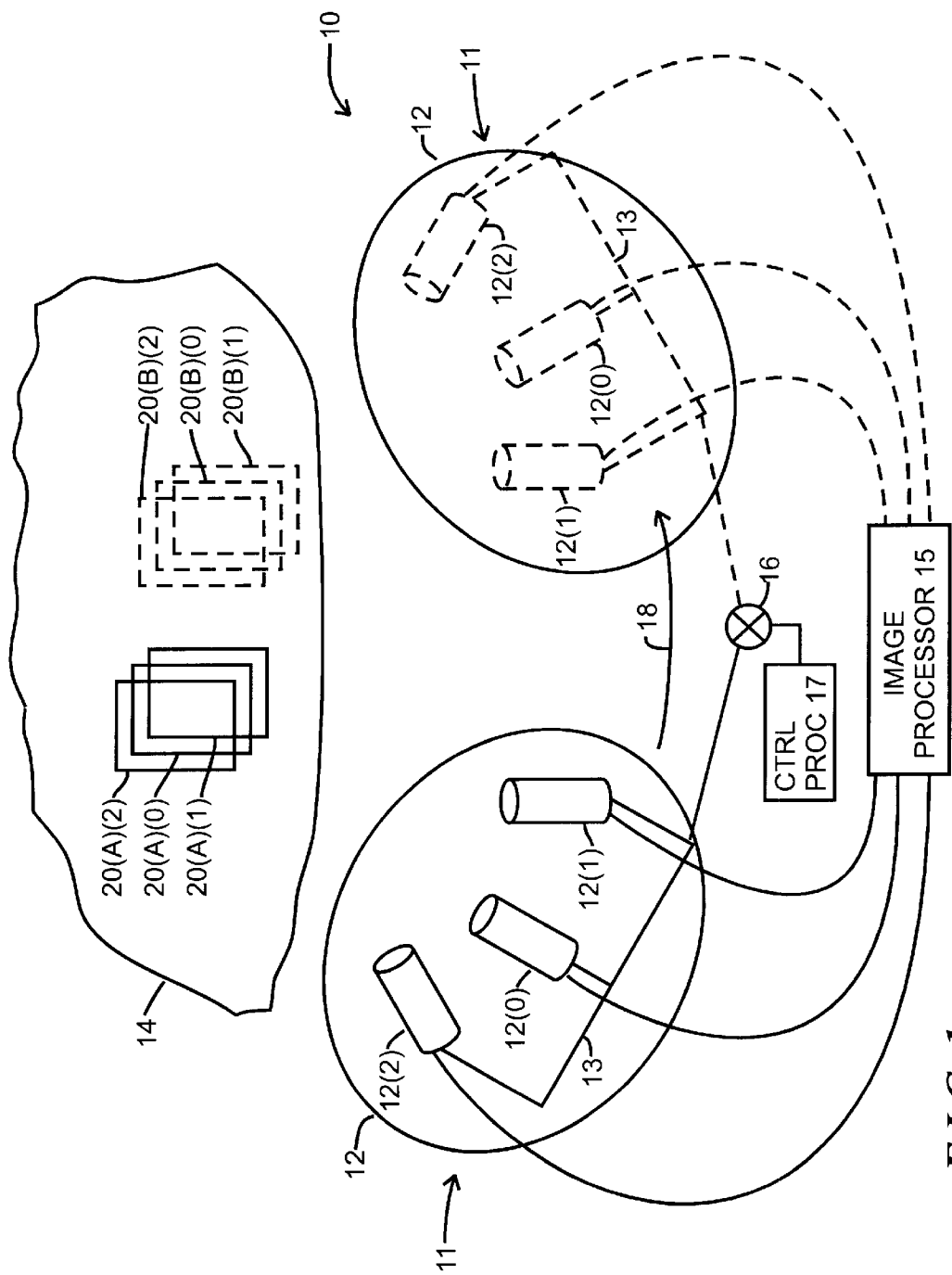
FIG. 1 schematically depicts a system for aligning a locally-reconstructed three-dimensional object to a global coordinate system using partially-detected control points, constructed in accordance with the invention.

FIG. 1 is a diagram of a system 10 for aligning a locally-reconstructed three-dimensional object to a global coordinate system using partially-detected control points, constructed in accordance with the invention. With reference to FIG. 1, system 10 includes a rig 11 that supports an optical head 12 that comprises a plurality of cameras 12(0) through 12(C) (generally referred to by reference numeral 12(c)) mounted on a common support 13. The cameras 12(c) are preferably focused on generally the same portion of a scene, including the same portion(s) of the surface(s) of one or more objects generally identified by reference numeral 14 in the scene, thereby to facilitate recording of a set of two-dimensional images of the respective portion(s) by the respective cameras 12(c). The cameras 12(c) provide the set of recorded images to an image processor 15 which generates, from the images provided thereto by the cameras 12(c), information relating to a three-dimensional reconstruction of surface features of the respective object(s) 14 in the scene, for the respective portion(s) to which the cameras 12(c) are focused. In one embodiment, the rig 11 and optical head are similar to the respective elements of the apparatus described in the aforementioned Albeck application. In that embodiment, the cameras 12(c) preferably include CCD ("charge-coupled device") image recording devices, which provide image information in digital form to the image processor 15 for processing. In addition, in that embodiment, the image processor 15 includes suitably-programmed computing devices (such as a suitably-programmed general purpose computer) that generate the three-dimensional surface information from the set of two-dimensional images in a manner similar to that described in the aforementioned Shashua application.

The system 10 is further provided with a motor 16 which, under control of a control processor 17, can move the rig 11 to facilitate direction of the cameras 12(c) to another portion of the scene 14, including respective other portion(s) of the surface(s) of respective object(s) in the scene 14 from which position the cameras 12(c) can record a second set of images. The rig 11 before one such illustrative movement, indicated in FIG. 1 by the arrow associated with reference numeral 18, is depicted in solid lines in FIG. 1, and rig 11 after the illustrative movement 18 depicted in dashed lines in FIG. 1. In addition, the set of images recorded by the respective cameras 12(c) prior to the illustrative movement 18 of rig 11 is represented by images 20(A)(0) through 20(A)(C) (generally identified by reference numeral 20(A)(c)), and the set of images recorded by the respective cameras 12(c) after the illustrative movement 18 of rig 11 is represented by images 20(B)(0) through 20(B)(C) (generally identified by reference numeral 20(B)(c)). The respective sets of images 20(A)(c) and 20(B)(c) are preferably not of coincident portions of the surface(s) of the object(s) 14 in the scene. Instead, the sets of images 20(A)(c) and 20(B)(c) will preferably be of different portions of the respective surface (s). The portions of the respective surface(s) represented by the sets of images 20(A)(c) and 20(B)(c) may, but need not, overlap.

The image processor 15 processes the images 20(A)(c) provided by the cameras 12(c) prior to the illustrative movement 18 to generate the three-dimensional surface information relating to the portion(s) of the object(s) depicted by the images 20(A)(c). In addition, the image processor 15 processes the images 20(B)(c) provided by the cameras 12(c) after the illustrative movement 18 to generate the three-dimensional surface information relating to the portion(s) of the object(s) depicted by images 20(B)(c). In one embodiment, operations performed by the image processor 15 in generating the three-dimensional surface information, in connection with the images recorded both before and after the illustrative movement 18, correspond to those operations described in the aforementioned Shashua application, and the information so generated may represent a three-dimensional reconstruction of the portion(s) of the object(s) depicted in the respective set of images. In that embodiment, the image processor 15 generates, from a plurality of sets of points $p_j$, $p_j'$ and $p_j''$ ("j" being an index) in images 20(A)(0) through 20(A)(2), respectively, with points $p_j$, $p_j'$ and $p_j''$ in each set corresponding to projections of a point $P_j$ on a surface of an object in the scene 14 onto the respective images 20(A)(0) through 20(A)(2), a tensor $T_A$. In generating the tensor $T_A$, the image processor 15 uses two-dimensional coordinates, in the respective images 20(A)(c), of a selected number of sets of respective points $p_j$, $p_j'$ and $p_j''$. As described in the Shashua application, seven sets of points $p_j$, $p_j'$ and $p_j''$ will suffice to enable the image processor 15 to generate the tensor $T_A$. As also described in the Shashua application, using the tensor $T_A$ and two-dimensional coordinates of any set of points $p_j$, $p_j'$ and $p_j''$ in the images 20(A)(c) which are projections of a point $P_j$ (including, but not limited to, the seven sets of points used to generate the tensor $T_A$), the image processor 15 can determine the three-dimensional coordinates of the corresponding point $P_j$ in the scene 14. The three dimensional coordinates of point $P_j$ will be in a coordinate system relative to one of the images 20(A)(c), illustratively the image 20(A)(0) recorded by camera 12(0) before the illustrative movement 18.

Similarly, the image processor generates, from coordinates a plurality of points $q_j$, $q_j'$ and $q_j''$ in images 20(B)(0) through 20(B)(2), respectively, all corresponding to projections of respective points $Q_j$ onto the respective images 20(B)(0) through 20(B)(2), a tensor $T_B$ and coordinates for the respective points $Q_j$ in a coordinate three-dimensional coordinate system relative to one of the images, illustratively image 20(B)(0), recorded by camera 12(0) after the illustrative movement 18. If optical head 12 is rigid under the movement, so that the cameras 12(c) will be in the same positions relative to each other before and after the illustrative movement 18, and if the three-dimensional coordinate systems are relative to images recorded by the same camera 12(0), then the tensor $T_B$ will correspond to the tensor $T_A$. On the other hand, if the optical head 12 is not rigid under the illustrative movement 18, the tensor $T_B$ will differ from the tensor $T_A$.

As noted above, the coordinates generated by the image processor 15 for points $P_j$ generated using images 20(A)(c) are defined relative to a three-dimensional coordinate system associated with one of the cameras 12(c), for example, camera 12(0), in its position, prior to the illustrative movement 18, at which image 20(A)(0) was recorded, and coordinates generated by the image processor 15 for points $Q_j$ from images 20(B)(c) are defined relative to a coordinate system that is preferably associated with the same camera 12(0), but which will be relative to the camera's position after the illustrative movement 18 at which image 20(B)(0) was recorded. In each case, the coordinates will be defined relative to two coordinate axes (illustratively referred to herein as "x" and "y" axes) which correspond to the plane of the respective image 20(A)(0) and 20(B)(0), and a third axis (illustratively referred to herein as a "z" axis) that is transverse thereto. It will be appreciated that the coordinate systems for the two sets of points $P_j$ and $Q_j$ in the scene 14 will differ. To be able to utilize both sets of points in a unitary fashion, it is desirable to associate them both to a common global coordinate system. The particular global coordinate system that is selected is not important. For simplicity and without loss of generality, the global coordinate system can be selected to be the local coordinate system before the illustrative movement 18 or after the illustrative movement 18. On the other hand, the global coordinate system may comprise a coordinate system separate from any of the local coordinate systems, illustratively, coordinate system 21.

Generally, the relation between the global coordinate system and the local coordinate systems consists of one or both of a translational component and/or a rotational component, both in three dimensional space. Thus, if the coordinate system associated with camera 12(0), both before and after the illustrative movement 18, has an origin at the center of the image plane of the camera 12(0), the translational component comprises the position of the center of the image plane after the illustrative movement 18, in the coordinate system associated with the camera 12(0) before the illustrative movement 18. In addition, the rotational component corresponds to the angle of the image plane after the illustrative movement 18, relative to the image plane before the illustrative movement 18. It will be appreciated that, if the position of the origin after the illustrative movement 18 corresponds to the position of the origin before the illustrative movement 18, there is no translational component for the illustrative movement 18. Similarly, if the angular position of the coordinate axes after the illustrative movement 18 corresponds to the angular position of the coordinate axes before the illustrative movement 18, there is no rotational component for the illustrative movement 18.

It will be appreciated that, if the position and angular orientation of the rig 11 before and after the illustrative movement 18 can be controlled or determined (by, for example, mechanical or electronic sensors) to a sufficient degree of accuracy they (that is, the position and angular orientation) can be used to define the translational and rotational components to relate the coordinate system after the illustrative movement 18 to the coordinate system before the illustrative movement 18. However, in one embodiment, to provide a higher degree of accuracy, the image processor 15 for each reconstruction uses information relating to respective control points (not separately shown) that are distributed throughout the scene, images of at least some of which may be recorded one or more of the images 20(A)(c) and/or 20(B)(c) in each set. Generally, separately from the recording of the sets of images before and after the illustrative movement 18, during a mapping stage information is generated as to the positions of the control points relative to the global coordinate system. That information, along with information about the ones of the control points recorded on respective ones of images 20(A)(c) can be used to facilitate relation of the local coordinate system associated with the optical head 12 in the various positions to the global coordinate system. Operations performed by the image processor 15 in determining the translational and rotational components relating a local coordinate system to the global coordinate system will be described in connection with flowchart depicted in FIG. 2. Before proceeding to a description of FIG. 2 and by way of background, given a set of three-dimensional control points $\{G_i\}_{i=1}^n$ in the scene, coordinates in the global coordinate system for which are measured in the mapping stage. The three dimensional control points $\{G_i\}_{i=1}^n$ generally have respective projections $p_i$, $p_i'$ and $p_i''$ in images 20(A)(c), although, as will be described below, not all control points need have projections in all three images. Assume further that the projection matrices for the respective images are represented by T, T' and T", each being a three-by four matrix. Assume further that the local coordinate system differs from the global coordinate system by a rotation R and a translation t. In that case, during the reconstruction phase, the coordinates of the points $p_i$, $p'_i$ and $p''_i$ of the control points $\{G_i\}_{i=1}^n$ in the images 20(A)(c) are given by $$T \cdot \begin{bmatrix} R & t \\ 0 & 0 & 0 & 1 \end{bmatrix} \cdot \begin{bmatrix} G_i \\ 1 \end{bmatrix} = \lambda_i \begin{bmatrix} p_i \\ 1 \end{bmatrix} \quad (1)$$

$$T' \cdot \begin{bmatrix} R & t \\ 0 & 0 & 0 & 1 \end{bmatrix} \cdot \begin{bmatrix} G_i \\ 1 \end{bmatrix} = \lambda'_i \begin{bmatrix} p'_i \\ 1 \end{bmatrix} \quad (2)$$

and $$T'' \cdot \begin{bmatrix} R & t \\ 0 & 0 & 0 & 1 \end{bmatrix} \cdot \begin{bmatrix} G_i \\ 1 \end{bmatrix} = \lambda''_i \begin{bmatrix} p''_i \\ 1 \end{bmatrix} \quad (3)$$

respectively. It will be appreciated that the matrix $$\begin{bmatrix} R & t \\ 0 & 0 & 0 & 1 \end{bmatrix}$$

in equations (1) through (3) effectively operates to transform the coordinates of the control points $\{G_i\}_{i=1}^n$ from the global coordinate system to the local coordinate system following the transformation, and multiplying by the respective projection matrix T, T' and T" provides the coordinates of the projections in the respective images 20(A)(c), up to a scale factor represented by the respective scalars $\lambda_i$, $\lambda'_i$ and $\lambda''_i$.

If the projection matrices T, T' and T" are decomposed into respective three by three and three by one sub-matrices T=[S s], T'=[S' s'] and T"=[S" s"], where sub-matrices S, S' and S" are three-by-three matrices and sub-matrices s, s' and s" are one-by-three matrices (or vectors) equations (1) through (3) can be rewritten as $$S \cdot (R \cdot G_i + t) + s = \lambda_i \begin{bmatrix} p_i \\ 1 \end{bmatrix} \quad (4)$$

$$S'' \cdot (R \cdot G_i + t) + s'' = \lambda_i'' \begin{bmatrix} p_i'' \\ 1 \end{bmatrix} \quad (5)$$

and $$S' \cdot (R \cdot G_i + t) + s' = \lambda_i' \begin{bmatrix} p_i' \\ 1 \end{bmatrix} \quad (6)$$

respectively. Since the matrices S, S', and S" are invertible, equations (4) through (6) can be re-written as $$R \cdot G_i + t = \lambda_i S^{-1} \cdot \begin{bmatrix} p_i \\ 1 \end{bmatrix} - S^{-1} \cdot s \quad (7)$$

$$R \cdot G_i + t = \lambda_i' S'^{-1} \cdot \begin{bmatrix} p_i' \\ 1 \end{bmatrix} - S'^{-1} \cdot s' \quad (8)$$

and $$R \cdot G_i + t = \lambda_i'' S''^{-1} \cdot \begin{bmatrix} p_i'' \\ 1 \end{bmatrix} - S''^{-1} \cdot s'' \quad (9)$$

respectively. Defining sets of three-dimensional points $\{P_i\}_{i=1}^{n}$, $\{P'_i\}_{i=1}^{n}$ and $\{P''_i\}_{i=1}^{n}$ by $$P_i = S^{-1} \cdot \begin{bmatrix} p_i \\ 1 \end{bmatrix}, \quad P_i' = S'^{-1} \begin{bmatrix} p_i' \\ 1 \end{bmatrix} \text{ and } P_i'' = S''^{-1} \begin{bmatrix} p_i'' \\ 1 \end{bmatrix}$$

and further defining $d=S^{-1} \cdot s$, $d'=S'^{-1} \cdot s'$ and $d''=S''^{-1} \cdot s''$, and noting that the left sides of equations (7) through (9) all equal $R \cdot G_i + t$, those equations (7) through (9) can be re-written $$R \cdot G_i + t = \lambda_i P_i - d = \lambda_i' P_i' - d' = \lambda_i'' P_i'' - d'' \quad (10)$$

Since the values of scalars $\{\lambda_i\}_{i=1}^{n}$, $\{\lambda'_i\}_{i=1}^{n}$ and $\{\lambda''_i\}_{i=1}^{n}$ are unknown, the points $P_i$, $P'_i$ and $P''_i$ can be normalized to $$Q_i = \frac{P_i}{\|P_i\|}, \quad Q_i' = \frac{P_i'}{\|P_i'\|} \text{ and } Q_i'' = \frac{P_i''}{\|P_i''\|},$$

where $\|P_i\|$, $\|P'_i\|$ and $\|P''_i\|$ represent the lengths of the vectors representing the points $P_i$, $P'_i$ and $P''_i$, respectfully in the local coordinate system, and in that case equation 10 can be re-written as $$R \cdot G_i + t = \lambda_i Q_i - d = \lambda_i' Q_i' - d' = \lambda_i'' Q_i'' - d'' \quad (11)$$

Using equation (10), the values of the scalars $\{\lambda_i\}_{i=1}^{n}$, $\{\lambda'_i\}_{i=1}^{n}$ and $\{\lambda''_i\}_{i=1}^{n}$ and the components of the rotation matrix R and the translation matrix t can be obtained by minimizing the cost function $$\sum_i \|(R \cdot G_i + t) - (\lambda_i Q_i - d)\|^2 + \quad (12)$$

-continued
$$\|(R \cdot G_i + t) - (\lambda_i' Q_i' - d')\|^2 + \|(R \cdot G_i + t) - (\lambda_i'' Q_i'' - d'')\|^2.$$

Note that, if the rotation matrix R and translation matrix t are known, which may be the case if the position and orientation of the local coordinate system relative to the global coordinate system are known, the values of the scalars $\{\lambda_i\}_{i=1}^{n}$, $\{\lambda'_i\}_{i=1}^{n}$ and $\{\lambda''_i\}_{i=1}^{n}$ can be determined by projecting the point $R \cdot G_i + t$ onto respective lines $\lambda_i Q_i - d$, $\lambda'_i Q'_i - d'$ and $\lambda''_i Q''_i - d''$. In that case, and since $Q^T Q = Q'^T Q' = Q''^T Q'' = 1$, where "T" represents the transpose operation, $$\lambda_i = (R \cdot G_i + t + d)^T \cdot Q_i \quad (13)$$

$$\lambda'_i = (R \cdot G_i + t + d)^T \cdot Q'_i \quad (14)$$

and $$\lambda''_i = (R \cdot G_i + t + d)^T \cdot Q''_i \quad (15).$$

On the other hand, if the values of the scalars $\{\lambda_i\}_{i=1}^{n}$, $\{\lambda'_i\}_{i=1}^{n}$ and $\{\lambda''_i\}_{i=1}^{n}$ are known, the rotation matrix R and translation matrix t can be determined using the well-known Singular Value Decomposition (SVD) algorithm that fits the sets of points $\{\lambda_i Q_i - d\}_{i=1}^{n}$, $\{\lambda'_i Q'_i - d'\}_{i=1}^{n}$ and $\{\lambda''_i Q''_i - d''\}_{i=1}^{n}$ to the set of control points $\{G_i\}_{i=1}^{n}$, repeated three times for each of the three sets.

Accordingly, one can start with the values of the rotation matrix R and translation matrix t and use them to determine the values of the scalars $\{\lambda_i\}_{i=1}^{n}$, $\{\lambda'_i\}_{i=1}^{n}$ and $\{\lambda''_i\}_{i=1}^{n}$, or start with the values of the scalars $\{\lambda_i\}_{i=1}^{n}$, $\{\lambda'_i\}_{i=1}^{n}$ and $\{\lambda''_i\}_{i=1}^{n}$ and use them to determine the values of the rotation matrix R and translation matrix t. In one embodiment, the image processor initially determines values of the scalars $\{\lambda_i\}_{i=1}^{n}$, $\{\lambda'_i\}_{i=1}^{n}$ and $\{\lambda''_i\}_{i=1}^{n}$ and uses them to determine the values of the rotation matrix R and translation matrix t. Initially, it determines the values of the scalars $\{\lambda_i\}_{i=1}^{n}$, $\{\lambda'_i\}_{i=1}^{n}$ and $\{\lambda''_i\}_{i=1}^{n}$ using the fact that the distance between two points in the scene is invariant when the optical head undergoes a rigid transformation (although the distance between the projections of the points in respective images may change) as follows. If projections of two different control points $G_i$ and $G_j$ appear in the same image, the distance between the points is given by $\|G_i - G_j\| = \|(R \cdot G_i + t) - (R \cdot G_j + t)\|$. Since $(R \cdot G_i + t) = (\lambda_i Q_i - d)$ and $(R \cdot G_j + t) = (\lambda_j Q_j - d)$, $\|G_i - G_j\| = \|\lambda_i Q_i - \lambda_j Q_j\|$.

On the other hand, if a control point $G_i$ in the scene is projected onto two images, then the values of the scalars $\{\lambda_i\}_{i=1}^{n}$ and $\{\lambda'_i\}_{i=1}^{n}$ associated with the respective images can be determined using the fact that $\lambda_i Q_i - d = \lambda'_i Q'_i - d'$ for the two images. This provides three equations for the two unknowns $\lambda_i$ and $\lambda'_i$, which can be solved in a conventional manner;

A third case is that each of two different control points $G_i$ and $G_j$ in the scene projects onto one of the two images. In that case, the distance between the two points is given by $\|G_i - G_j\| = \|(R \cdot G_i + t) - (R \cdot Q_j + t)\|$, in which case $\|G_i - G_j\| = \|(\lambda_i Q_i - d) - (\lambda_j Q_j - d')\|$. However, since this case is less useful than the two described above, it will not be considered further.

Considering the first case, that is, the case in which projections of two different control points $G_i$ and $G_j$ appear in the same image, as noted above, the distance between the points is given by $\|G_i - G_j\| = \|\lambda_i Q_i - \lambda_j Q_j\|$. Defining $g_{i,j} = (G_i - G_j)^T (G_i - G_j)$ and $q_{i,j} = Q_i^T \cdot Q_j$, that equation can be re-written as $$\lambda_i^2 - 2\lambda_i \lambda_j q_{i,j} + \lambda_j^2 = g_{i,j} \quad (16).$$

In the case of "m" points, use of equation (16) provides $$\begin{bmatrix} m \\ 2 \end{bmatrix}$$

(that is, the combination of "m" things taken "two" at a time) equations. Accordingly, if there are, for example, three points ("m"=3), there will be three equations. The appendix attached hereto includes the output of a program in the Maple symbolic language that shows one to obtain a fourth-degree equation in $\lambda_i^2$ that can be solved explicitly. If there are more than three points (that is, "m">3) there are more equations than unknowns and a methodology such as the Levenberg-Marquardt procedure can be used to obtain a solution for the system of equations defined by equation (16).

If the value of one of the scalars, illustratively $\lambda_j$, is already known, the values of the other scalars can be found by finding a point along a line that passes through the origin of the local coordinate system and has a direction towards point $Q_j$. In that case, the distance from the known point $\lambda_j Q_j$ is $\|G_i - G_j\|$. If the projection of $\lambda_i Q_i$ is further from that line than $\|G_i - G_j\|$, then the projection is the best solution, and, otherwise there are two equally good solutions.

Considering the second case, in which a point in the scene is projected onto two images, then $$[Q_i - Q'_i]\begin{bmatrix} \lambda_i \\ \lambda'_i \end{bmatrix} = [d - d']. \tag{17}$$

The matrix $[Q_i - Q'_i]$ in equation (17) is a three-row by two-column matrix (that is, $Q_i$ and $Q'_i$ are both three-element vectors) and the uniqueness and stability of the solution of the system defined by equation (17) depends on the rank of the matrix. Note that, if a point appears in all three images, the equation $\lambda_i Q_i - d = \lambda'_i Q'_i - d' = \lambda''_i Q_i - d''$ (reference equation (11)) yields $$\begin{bmatrix} Q_i & -Q'_i & 0 \\ Q_i & 0 & -Q''_i \end{bmatrix}\begin{bmatrix} \lambda_i \\ \lambda'_i \\ \lambda''_i \end{bmatrix} = \begin{bmatrix} d - d' \\ d - d'' \end{bmatrix}, \tag{18}$$

which is a system of six equations on three unknowns, a solution for which can be obtained in a conventional manner.

As noted above, after the values for the scalars $\{\lambda_i\}_{i=1}^n$, $\{\lambda'_i\}_{i=1}^n$ and $\{\lambda''_i\}_{i=1}^n$ have been determined, the rotation matrix R and translation matrix t can readily be determined using the well-known Singular Value Decomposition (SVD) algorithm that fits the three sets of points $\{\lambda_i Q_i - d\}_{i=1}^n$, $\{\lambda'_i Q'_i - d'\}_{i=1}^n$ and $\{\lambda''_i Q''_i - d''\}_{i=1}^n$ to the set of control points $\{G_i\}_{i=1}^n$, repeated three times once for each set.

Figure 2:
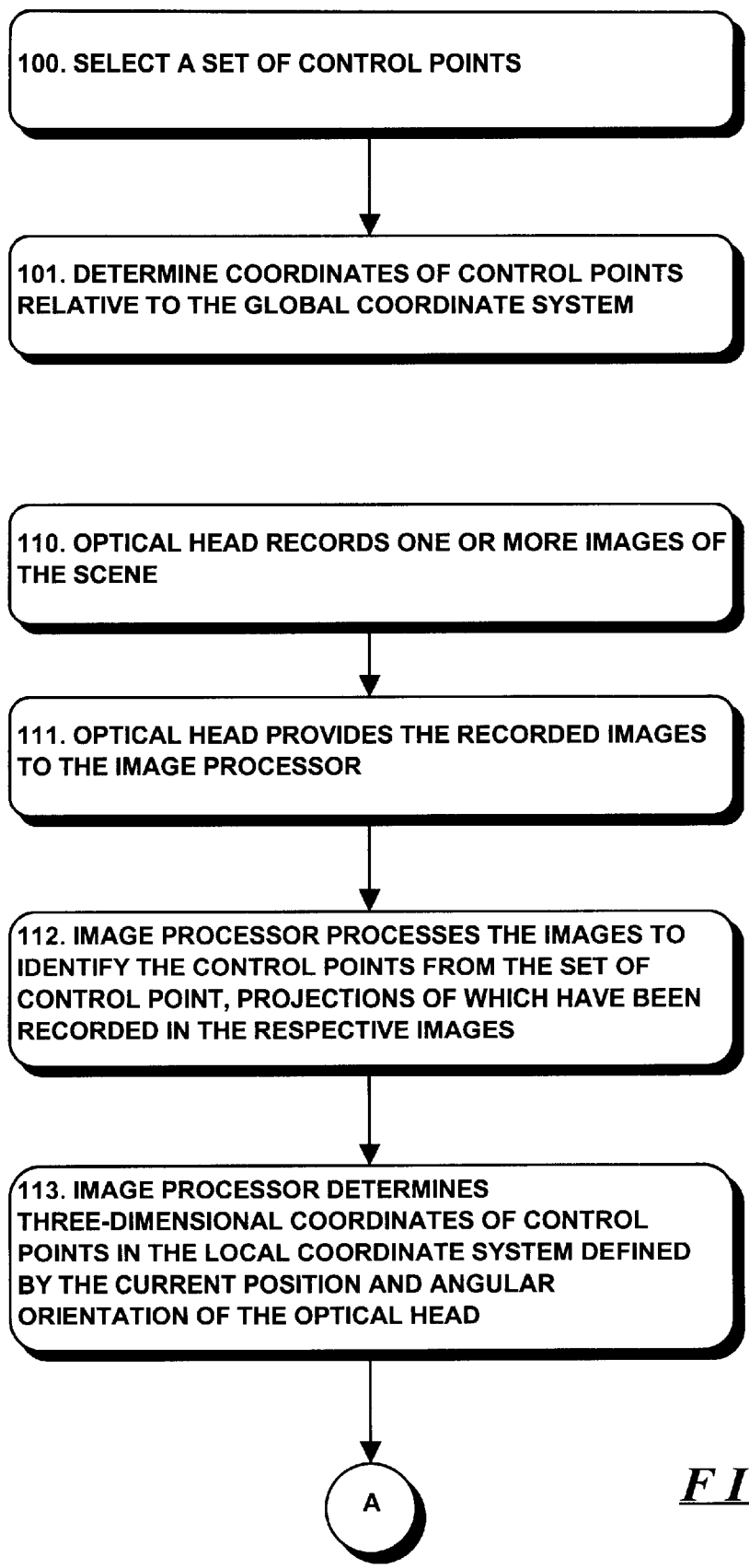
FIG. 2 is a flow chart depicting operations performed by the system in connection with aligning a locally-reconstructed three-dimensional object to a global coordinate system using partially-detected control points.
Figure 2A:
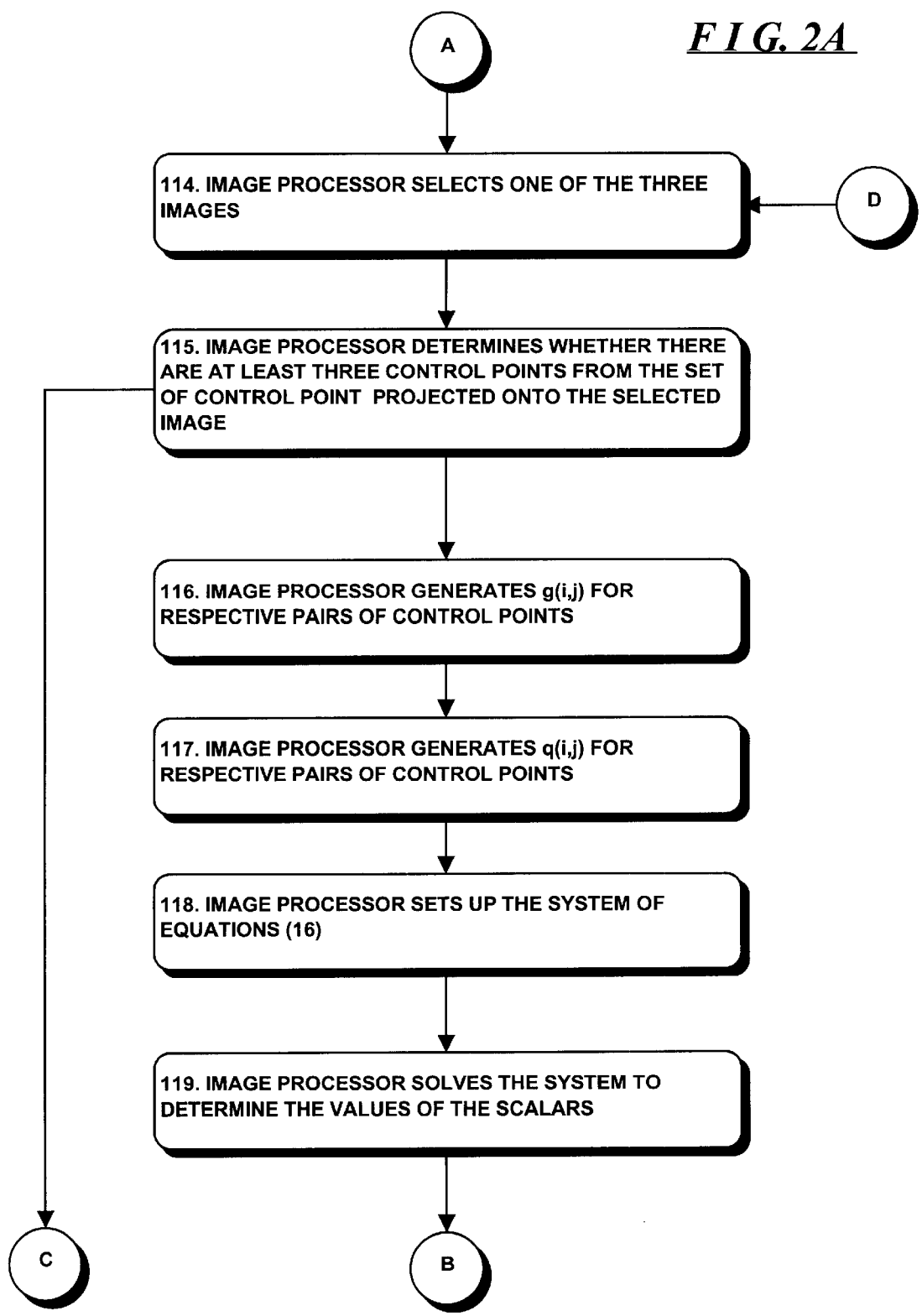

With this background, operations performed by the system 10 will be described in connection with the flow chart in FIG. 2. With reference to FIG. 2, initially a series of operations are performed which together comprise the mapping stage. The mapping stage may be performed by the system 10 or by another device that can detect the control points and determine their coordinates in three dimensional space relative to the global coordinate system. In the mapping stage, a set of control points $\{G_i\}_{i=1}^n$, is initially selected (step 100), and their coordinates relative to the global coordinate system determined (step 101). Step 101 can be performed in a number of ways as will be apparent to those skilled in the art; several methodologies are described in U.S. Pat. No. 5,598,515, issued Jan. 28, 1997, in the name of Amnon Shashua, and entitled "System And Method For Reconstructing Surface Elements Of Solid Objects In A Three-Dimensional Scene From A Plurality Of Two Dimensional Images Of The Scene," and U.S. Pat. No. 5,821,943, issued Dec. 13, 1998, in the name of Amnon Shashua, and entitled "Apparatus And Method For Recreating And Manipulating A 3D Object Based On A 2D Projection Thereof, both assigned to the assignee of this application.

After the mapping stage has been completed, the system 10 can use the information determined for the control points during the mapping stage, and information determined for the control points as recorded in images 20(A)(c) or 20(B)(c), respectively, to determine the rotational matrix R and translation matrix t that relate the global coordinate system to the local coordinate system associated with respective images 20(A)(c) or 20(B)(c). In those operations, the optical head can record one or more images of the scene (step 110) and provide the recorded images to the image processor (step 111). The image processor, in turn, processes the images to identify the control points from the set of control point $\{G_i\}_{i=1}^n$, projections of which have been recorded in the respective images (step 112) and determines their three-dimensional coordinates in the local coordinate system defined by the current position and angular orientation of the optical head (step 113). The image processor then selects one of the three images (step 114) and determines whether there are at least three control points from the set of control point $\{G_i\}_{i=1}^n$ projected onto the selected image (step 115). If the image processor makes a positive determination in step 115, it proceeds to process the image in accordance with the first case mentioned above. In that operation, the image processor generates $g_{i,j} = (G_i - G_j)^T (G_i - G_j)$ for the respective pairs of control points (step 116) and $q_{i,j} = Q_i^T \cdot Q_j$ (step 117), sets up the system of equations $$\lambda_i^2 - 2\lambda_i \lambda_j q_{i,j} + \lambda_j^2 = g_{i,j} \tag{19}$$

(step 118), and solves the system to determine the values of the scalars $\lambda_i$ and $\lambda_j$ (step 119). It will be appreciated that the methodology used by the image processor in solving the system of equations in step 119 will depend on whether three control points appear in the selected image or more than three control points. If three control points appear in the selected image, the image processor can use the methodology detailed in the attached appendix. On the other hand, if more than three control points appear in the selected image, the image processor makes use of the Levenberg-Marquardt methodology to solve the system of equations.

Returning to step 115, if the image processor makes a negative determination in that step, it sequences to step 120 to determine whether one or two control points were projected onto the selected image. If the image processor makes a positive determination in step 120, it sequences to step 121 in which it selects one of the points and determines whether the selected control point was also projected onto one or more of the other images. If the image processor makes a positive determination in step 121, it generates values of $Q_i$ and $Q'_i$ and d–d' therefor for the respective images, along with $Q''_i$ and d–d" if the control point was projected onto the third image (step 122). Thereafter, the image processor uses equation 16, or equation 17 if the control point was projected onto the third image, to determine values for the respective scalars $\lambda_i$ and $\lambda'_i$ as well as $\lambda''_i$ if the control point was projected onto the third image (step 123).

After the image processor has performed steps 121 through 123 in connection with the control point that was selected in step 120 projected onto the image that had been selected in step 114, it determines whether there is another control point projected onto the same image that has not been processed (step 124). If the image processor makes a positive determination in connection with step 124, it returns to step 120 to select the other control point projected on the selected image. Thereafter, the image processor performs steps 121 through 123 in connection with the other control point projected onto the selected image.

Following (i) step 119;

(ii) step 124 if the image processor makes a negative determination in that step, or (iii) step 120 if the image processor makes a negative determination in that step, the image processor sequences to step 125 to determine whether it has selected all of the images recorded by the optical head in step 110. If the image processor makes a negative determination in step 125, it returns to step 114 to select the next image. The image processor will perform steps 115 through 125 in connection with each of the images recorded by the optical head in step 110.

After the image processor has processed all of the images recorded in step 110, it determines the rotation matrix R and translation matrix t using the well-known Singular Value Decomposition (SVD) algorithm that fits the sets of points $\{\lambda_i Q_i - d\}_{i=1}^n$, $\{\lambda'_i Q'_i - d'\}_{i=1}^n$ and $\{\lambda''_i Q''_i - d''\}_{i=1}^n$ to the set of control points $\{G_i\}_{i=1}^n$, repeated three times for each of the three sets of points (step 126). The rotation matrix R and translation matrix t relate the local coordinate system to the global coordinate system and can be used to relate three-dimensional coordinates of other points in the scene in the local coordinate system, as determined by the image processor from the images recorded in step 110, to the global coordinate system. This can be used, for example, to relate reconstructions of the scene made from a number of orientations, each of which may include a different portion of the scene, to the global coordinate system, effectively stitching them together.

The invention provides a number of advantages. In particular, the invention provides an arrangement for relating a local coordinate system to a global coordinate system, using control points information for which is obtained during a mapping stage. Since this can be accomplished for each position of the optical head 12, there is no necessity of having reconstructions of overlapping portions of the scene to relate respective local coordinate systems to the global coordinate system. The relation between each local coordinate system to the global coordinate system is determined independently of any other local coordinate systems.

It will be appreciated that a number of modifications may be made to the system described above. For example, although the invention has been described in relation to the system depicted in FIG. 1 and described in the Albeck application, it will be appreciated that the invention can be used in connection with any arrangement which facilitates reconstruction of surface features of objects in a scene using images of the surface features. The invention can be used in connection with any arrangement that makes use of any number of images to facilitate the reconstruction, including arrangements that make use of three images, as in the arrangement described in the Shashua patent, arrangements that make use of two images, as well as arrangements that make use of different numbers of images.

In addition, it will be appreciated that the mapping information, which is determined during the mapping stage, may be developed in any manner and by any type arrangement. For example, the mapping information may be determined in whole or in part by the system 10 as described above. Alternatively, the mapping information may be developed by other arrangements that can determine the three dimensional coordinates of the control points from two dimensional images relative to the global coordinate system, or by other arrangements, such as directly measuring the positions of the control points relative to the global coordinate system.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

APPENDIX

MAPLE program on 3 points fitting.

```
> restart;A12:=l1 ^ 2 - 2*l1*l2*q12 + l2 ^ 2 - g12;
        A12 := l1² - 2 l1 l2 q12 + l2² - g12
> A13:=l1 ^ 2 - 2*l1*l3*q13 + l3 ^ 2 - g13;
        A13 := l1² - 2 l1 l3 q13 + l3² - g13
> A23:=l2 ^ 2 - 2*l2*l3*q23 + l3 ^ 2 - g23;
        A23 := l2² - 2 l2 l3 q23 + l3² - g23
> A13-A23;
        l1² - 2 l1 l3 q13 - g13 - l2² + 2 l2 l3 q23 + g23
> l3:=solve(A13 - A23, l3);
```

$$l3 := 1/2 \frac{l1^2 + g23 - g13 - l2^2}{-l2\, q23 + l1\, q13}$$

```
> B12:=collect(numer(simplify(A13)),l2);
B12 := l2⁴ - 4 l1 q13 l2³ q23 +
    (-2 g23 + 4 l1² - q13² + 4 l1² q23² - 4 g13 q23² - 2 l1² + 2 g13)
    l2² + (4 l1 q13 g23 q23 - 4 l1³ q23 q13 + 4 l1 q13 g13 q23) l2 +
    2 l1² g23 + g13² 4 l1² q13² g23 - 2 g23 g13 2 l1² g13 +
    l1⁴ + g23²
> B12elim4:=simplify(coeff(B12,l2,4)/coeff(A12,l2,2));
        B12elim4 := 1
> B12free4 := simplify(B12 - A12*l2 ^ 2*B12elim4);
B12free4 := - 4 l1 q13 l2³ q23 - 2 g23 l2² + 4 l1² q13² l2² +
    4 l1² l2² q23² - 4 g13 l2² q23² - 3 l1² l2² + 2 g13 l2² +
    4 l1 q13 g23 l2 q23 - 4 l1³ l2 q23 q13 + 4 l1 q13 g13 l2 q23 +
    2 l1² g23 + g13² - 4 l1² q13² g23 - 2 g23 g13 - 2 l1² g13 +
    l1⁴ + g23² + 2 l2² l1 q12 + l2² g12
> B12elim3 := simplify(coeff(B12free4,l2,3)/coeff(A12,l2,2));
        B12elim3 := - 4 l1 q13 q23 + 2 l1 q12
> B12free3 := simplify(B12free4 - A12*l2*B12elim3);
B12free3 := 4 l1² l2² q23² + 2 l1² g23 - 2 l1² g13 3 l1² l2² + g23² -
    2 g23 - g13 - 2 g23 l2² + g13² + 2 g13 l2² + l2² g12 + l1⁴ -
    4 l1² q13² g23 + 4 l1² q13² l2² 4 g13 l2² q23² +
    4 l1 q13 g23 l2 q23 + 4 l1 q13 g13 l2 q23 + 4 l1² l2² q12² -
    2 l2 l1³ q12 - 8 l1² l2² q12 q13 q23 - 4 l2 g12 l1² q13 q23 +
    2 l2 g12 l1 q12
> C12:=simplify(B12free3*coeff(A12,l2,2) -A12*coeff(B12free3,l2,2));
```

APPENDIX-continued

MAPLE program on 3 points fitting.

```
C12 := - 4 l1³ q13² + 4 l1² g23 - 4 l1² g13 + g23² - 2 g23 g13 + g13² -
    4 l1² q23² - 4 l1² g12 + 4 l1⁴ - 4 l1² q13² g23 +
    4 l1 q13 g23 l2 q23 + 4 l1 q13 g13 l2 q23 - 8 l2 l1³ q12 +
    4 l1² g13 q23² + 8 l1³ l2 q12³ + 4 g12 l1² q23² 4 l1⁴ q12² -
    4 l2 g12 l1 q13 q23 + 4 l2 g12 l1 q12 + 8 l1⁴ q12 q13 q23 +
    8 l1³ l2 q12 q23² - 2 g12 g23 + 2 g12 g13 + g12² +
    8 l1³ l2 q12 q13² - 8 l1 l2 q12 g13 q23² -
    16 l1³ l2 q12² q13 q23 - 4 l1 l2 q12 g23 + 4 l1 l2 q12 ql3 +
    4 g12 l1² q13² - 4 g12 g13 q23² + 4 g12 - l1² q12² -
    8 g12 l1² q12 q13 q23
> l2 := - coeff(C12,l2,0)/coeff(C12,l2,1);
l2 := - (-4 l1⁴ q13² + 4 l1² g23 - 4 l1² g13 + g23² - 2 g23 g13 +
    g13² - 4 l1⁴ q23² - 4 l1² g12 + 4 l1⁴ 4 l1² q13² g23 +
    4 l1⁴ g13 q23⁴ + 4 g12 l1² q23² - 4 l1⁴ q12² +
    8 l1⁴ q12 q13 q23 - 2 g12 g23 + 2 g12 g13 + g12² +
    4 g12 l1² q13² - 4 g12 g13 q23² + 4 g12 l1² q12² -
    8 g12 l1² q12 q13 q23)/(4 l1 q13 g23 q23 +
    4 l1 q13 g13 q23 - 8 l1³ q12 + 8 l1³ q12³ - 4 g12 l1 q13 q23 +
    4 g12 l1 q12 + 8 l1³ q12 q23² + 8 l1³ q12 q13² -
    8 l1 q12 g13 q23² - 16 l1³ q12² q13 q23 - 4 l1 q12 g23 +
    4 l1 q12 g13)
> A := simplify(numer(A12)):
> factor (coeff(A,l1,0);
(-4 g12 g13 q23² + g12² + 2 g12 g13 + g13² + g23² - 2 g12 g23 -
    2 g23 g13)²
> coeff(A,l1,1);
        0
> factor (coeff(A,l1,2)
-16 g12³ q13² q23² - 24 g12² q13² g23 + 24 g12 q13² g23² +
    8 g12 q13² g13² + 16 g12² g13 q13² - 40 g12² q13 q12 q13 q23 -
    16 g12² q12² g13 q23² + 32 g12 q13 q23² q12 g13 g23 +
    32 g13² g12 q12 q23² q13 + 32 g12² g13 q12 q23² q13 -
    32 q12² g23 g13 g12 + 8 g13² q12 q13 q23 + 8 g12² q12 q13² q23

8 g23² g12 q12 q13 q23 - 16 q12² g23² g13 q23² -
    8 g23 g13² q12 q13 q23 + 48 g23 g13 g12 q12 q13 q23 +
    8 g23³ q12 q13 q23 - 8 g12³ + 32 g12² q13² - g23 q23² -
    16 g12 q13² g23² q23² - 16 g12 q13² g13² q23² -
    32 g13² q23⁴ g12 - 16 g12² q23² g23 - 32 g12² q23² g13 +
    56 g12² q13 q23² + 48 g12 q23 g13 + 56 g13² g12 q23² +
    8 g23² g13 q23² + 8 g23² g12 q23² + 16 g23² g13 q13² -
    16 923 g13² q23² - 8 g13² q13² g23 - 24 q12² g23 g13² . -
    64 g12 g23 g13 q23² - 24 g13² g12 + 16 q12² g23² g12 +
    8 g12² q13² + 24 g12² g13 + 8 g12³ q23² - 24 g23² g13 -
    24 g23² g12 + 24 g23 g13² + 24 923 g12² - 8 g23² q13² +
    8 g13³ q23² + 8 q12² g13³ - 8 q12² g23³ - 32 g12 g23 g13 q13² +
    32 q12² g23 g13² q23² - 40 g13² g12 q12 q13 q23 +
    24 q12² g23² g13 + 16 q12² g13² g12 - 16 q12² g13³ q23² -
    8 g12² q12² g23 + 8 g12² q12² g13 - 8 g12² g23 q12 q13 q23 +
    8 g23³ - 8 g13³ - 8 g12 g23² q13 g13 q23
> coeff(A,l1,3)
        0
> factor(coeff(A,l1,4));
64 q23⁴ g12 g13 - 32 q12³ g12 g13 q13 q23 - 32 g12 q12 q13³ g13 q23 +
    64 q12² g12 q13² g13 q23² - 32 q12 g12² q13³ q23 +
    16 g12² q12² q13² - 32 q12² g23² q13 q23 +
    64 q12² g12 q13² q23² g23² - 32 q13⁴ g23 g12 + 48 g13² g23 g13 -
    48 g12 q13² g13 + 48 g23 g13 q23² + 48 g12 g23 q23² +
    48 q12² q13² q23² - 48 g12 q12² q12² g13 - 64 q13² g23 q23² g12 -
    32 q13 g23 q23 g12 - 32 q13 g23 q23³ q12 g13 +
    16 q13 g23² q23 q12 - 32 q13 g23 q23 q12 g13 +
    16 q13² g23² q23² + 16 q13² g13² q23² + 32 g12 q12² g13 q23² +
    48 g12 q12² g23 + 16 g12² q12 q13 q12 - 8 g12² q12² -
    128 g12 q - l3 q23² q12 g13 + 16 q13 g13² q23 q12 +
    32 q13² g13 q23² g12 + 160 q13 g13 q23 g12 q12 -
    32 q13 g13² q23³ q12 + 24 g23² - 48 g23 g13 + 24 g13² -
    40 q12² g13² - 32 q12⁴ g23 g13 - 40 q12² g23² +
    80 g12 q13² g23 - 64 q12² q13 q23² g23 + 48 q12² g13² q23² +
    80 q12² g23g13 - 48 g12 g23 + 48 g12 g13 + 24 g12² -
    112 g12 g13 q23² - 40 g12² q13² + 16 g13² q23⁴ - 40 g12 q23² +
    16 g12² q23⁴ + 16 q13⁴ g23² + 16 g12² q13² - 8 g13² q13² -
    40 q13² g23² - 40 q13² q23² - 8 g23² q23² + 16 q12⁴ g23² +
    16 q12⁴ g132 - 64 q122 g23 q13 q132 + 64 q12³ g23 g13 q13 q23 -
    32 q12³ g13² q13 q23 - 32 q12 q13³ g23² q23 -
    32 q12 q13³ g23 g13 q23 + 16 g12² q12² q23² +
    16 g23² q23² q23² + 48 q12² g23² q13² + 16 q12² g13² q13² -
    64 q12² q13² g23 g12 + 64 q12 q13² g23 g12 q23 +
    64 q12² g23 g13 q13² q23² - 32 g12 q12 q23² q13 g23 -
    32 q12 g12² q23² q13 - 32 q12² g12 g23 q13 q23
> coeff(A,l1,5)
        0
> factor(coeff(A,l1,6))
-32 (-1 + q12² + q13² - 2 q12 q13 q23 + q23²) (-q12² g23 +
    2 q12² q13² g23 + q12² g13 q13 g23 q12 q13 g23 q23 q12 -
    g12 q12 q13 g23 - q13² g23 - g12 + q23² g12 - g13 + g23 +
    g13 q23² + g12 q13²)
> coeff(A,l1,7)
        0
> factor(coeff(A,l1,8))
16 (-1 + q12² + q13² - 2 q12 q13 q23 + q23²)²
```

What is claimed as new and desired to be secured by Letters Patent of the United States is:

1. A system for aligning a locally-reconstructed three-dimensional object in a scene to a global coordinate system comprising:

A. a control point information generator configured to identify in at least image associated with a local reconstruction of said object a projection of at least one control point in the scene onto said at least one image, and generate local projected coordinate information indicating coordinates of said projection in said at least one image; and B. an alignment information generator configured to utilize said local projected coordinate information and mapping information relating to global coordinate information indicating coordinates of said at least one control point relative to said global coordinate system to generate alignment information relating a local coordinate system associated with said local reconstruction to said global coordinate system.

2. A system as defined in claim 1 in which said alignment information includes rotation information indicating an angular orientation of said local coordinate system relative to said global coordinate system.

3. A system as defined in claim 1 in which said alignment information includes translation information indicating a translational displacement of said local coordinate system relative to said global coordinate system.

4. A system as defined in claim 1 in which the control point information generator is configured to generate the local projected coordinate information as the value of a plurality of scalars $\lambda_i$ and $\lambda_j$ relation to $\|G_i - G_j\| = \|\lambda_i Q_i - \lambda_j Q_j\|$, where $\|G_i - G_j\|$ represents a distance between control points $G_i$ and $G_j$ in the scene and $$Q_i = \frac{P_i}{\|P_i\|},$$

where $$P_i = S^{-1} \cdot \begin{bmatrix} p_i \\ 1 \end{bmatrix},$$

$p_i$ representing a projection of control point $G_i$ into the at least one image, and S represents a portion of a projection matrix defining projections from the scene into the at least one image.

5. A system as defined in claim 1 in which the control point information generator is configured to identify projections of one control point onto each of two images and generate the control point information coordinate information therefrom.

6. A system as defined in claim 5 in which the control point information generator is configured to generate the local projected coordinate information as the value of a plurality of scalars $\lambda_i$ and $\lambda'_i$ in relation to $\lambda_i Q_i - d = \lambda'_i Q'_i - d'$, where $$Q_i = \frac{P_i}{\|P_i\|} \left( P_i = S^{-1} \cdot \begin{bmatrix} p_i \\ 1 \end{bmatrix} \right)$$

and $d = S^{-1} \cdot s$ and $d' = S'^{-1} \cdot s'$, with "S" and "s" both representing portions of a respective projection matrix defining projections from the scene into one of the images, and "S'" and "s'" both representing portions of a respective projection matrix defining projections from the scene into the other of the images.

7. A system as defined in claim 5 in which the control point information generator is configured to identify projections of one control point onto each of three images and generate the control point information coordinate information therefrom.

8. A system as defined in claim 1 in which said alignment information generator is configured to generate said alignment information by using a Singular Value Decomposition (SVD) algorithm that fits sets of points $\{\lambda_i Q_i - d\}_{i=1}^n$, $\{\lambda'_i Q'_i - d'\}_{i=1}^n$ and $\{\lambda''_i Q''_i - d''\}_{i=1}^n$ to the control points $\{G_i\}_{i=1}^n$, where $$Q_i = \frac{P_i}{\|P_i\|} \left( P_i = S^{-1} \cdot \begin{bmatrix} p_i \\ 1 \end{bmatrix} \right)$$

and $d = S^{-1} \cdot s$, $d' = S'^{-1} \cdot s'$ and $d'' = S''^{-1} \cdot s''$, with "S" and "s" both representing portions of a respective projection matrix defining projections from the scene into one of the images, and "S'" and "s'" both representing portions of a respective projection matrix defining projections from the scene into another of the images, and "S''" and "s''" both representing portions of a respective projection matrix defining projections from the scene into the third of the images.

9. A method for aligning a locally-reconstructed three-dimensional object in a scene to a global coordinate system comprising the steps of:

A. a control point information generating step in which is identified in at least image associated with a local reconstruction of said object a projection of at least one control point in the scene onto said at least one image, and is generated local projected coordinate information indicating coordinates of said projection in said at least one image; and B. an alignment information generating step in which are utilized said local projected coordinate information and mapping information relating to global coordinate information indicating coordinates of said at least one control point relative to said global coordinate system to generate alignment information relating a local coordinate system associated with said local reconstruction to said global coordinate system.

10. A method as defined in claim 9 in which said alignment information includes rotation information indicating an angular orientation of said local coordinate system relative to said global coordinate system.

11. A method as defined in claim 9 in which said alignment information includes translation information indicating a translational displacement of said local coordinate system relative to said global coordinate system.

12. A method as defined in claim 9 in which the control point information generating step includes the step of generating the local projected coordinate information as the value of a plurality of scalars $\lambda_i$ and $\lambda_j$ in relation to $\|G_i - G_j\| = \|\lambda_i Q_i - \lambda_j Q_j\|$, where $\|G_i - G_j\|$ represents a distance between control points $G_i$ and $G_j$ in the scene and $$Q_i = \frac{P_i}{\|P_i\|},$$

where $$P_i = S^{-1} \cdot \begin{bmatrix} p_i \\ 1 \end{bmatrix},$$

$p_i$ representing a projection of control point $G_i$ into the at least one image, and S represents a portion of a projection matrix defining projections from the scene into the at least one image.

13. A method as defined in claim 9 in which the control point information generating step includes the steps of identifying projections of one control point onto each of two images and generating the control point information coordinate information therefrom.

14. A method as defined in claim 13 in which the control point information generating step includes the step of generating the local projected coordinate information as the value of a plurality of scalars $\lambda_i$ and $\lambda'_i$ in relation to $\lambda_i Q_i - d = \lambda'_i Q'_i - d'$, where $$Q_i = \frac{P_i}{\|P_i\|} \left( P_i = S^{-1} \cdot \begin{bmatrix} p_i \\ 1 \end{bmatrix} \right)$$

and $d = S^{-1} \cdot s$ and $d' = S'^{-1} \cdot s'$, with "S" and "s" both representing portions of a respective projection matrix defining projections from the scene into one of the images, and "S'" and "s'" both representing portions of a respective projection matrix defining projections from the scene into the other of the images.

15. A method as defined in claim 13 in which the control point information generating step includes the steps of identifying projections of one control point onto each of three images and generating the control point information coordinate information therefrom.

16. A method as defined in claim 9 in which said alignment information generating step includes the step of generating said alignment information by using a Singular Value Decomposition (SVD) algorithm that fits sets of points $\{\lambda_i Q_i - d\}_{i=1}^n$, $\{\lambda'_i Q'_i - d'\}_{i=1}^n$ and $\{\lambda''_i Q''_i - d''\}_{i=1}^n$ to the control points $\{G_i\}_{i=1}^n$, where $$Q_i = \frac{P_i}{\|P_i\|} \left( P_i = S^{-1} \cdot \begin{bmatrix} p_i \\ 1 \end{bmatrix} \right)$$

and $d = S^{-1} \cdot s$, $d' = S'^{-1} \cdot s'$ and $d'' = S''^{-1} \cdot s''$, with "S" and "s" both representing portions of a respective projection matrix defining projections from the scene into one of the images, and "S'" and "s'" both representing portions of a respective projection matrix defining projections from the scene into another of the images, and "S''" and "s''" both representing portions of a respective projection matrix defining projections from the scene into the third of the images.

17. A computer program product for use in connection with a computer to provide a system for aligning a locally-reconstructed three-dimensional object in a scene to a global coordinate system comprising a computer readable medium having encoded thereon:

A. a control point information generator module configured to enable said computer to identify in at least image associated with a local reconstruction of said object a projection of at least one control point in the scene onto said at least one image, and generate local projected coordinate information indicating coordinates of said projection in said at least one image; and B. an alignment information generator module configured to enable the computer to utilize said local projected coordinate information and mapping information relating to global coordinate information indicating coordinates of said at least one control point relative to said global coordinate system to generate alignment information relating a local coordinate system associated with said local reconstruction to said global coordinate system.

18. A system as defined in claim 17 in which said alignment information includes rotation information indicating an angular orientation of said local coordinate system relative to said global coordinate system.

19. A system as defined in claim 17 in which said alignment information includes translation information indicating a translational displacement of said local coordinate system relative to said global coordinate system.

20. A system as defined in claim 17 in which the control point information generator module is configured to enable said computer to generate the local projected coordinate information as the value of a plurality of scalars $\lambda_i$ and $\lambda_j$ in relation to $\|G_i-G_j\|=\|\lambda_i Q_i-\lambda_j Q_j\|$, where $\|G_i-G_j\|$ represents a distance between control points $G_i$ and $G_j$ in the scene and $$Q_i = \frac{P_i}{\|P_i\|},$$

where $$P_i = S^{-1} \cdot \begin{bmatrix} p_i \\ 1 \end{bmatrix},$$

$p_i$ representing a projection of control point $G_i$ into the at least one image, and S represents a portion of a projection matrix defining projections from the scene into the at least one image.

21. A system as defined in claim 17 in which the control point information generator module is configured to enable said computer to identify projections of one control point onto each of two images and generate the control point information coordinate information therefrom.

22. A system as defined in claim 21 in which the control point information generator module is configured to enable said computer to generate the local projected coordinate information as the value of a plurality of scalars $\lambda_i$ and $\lambda'_i$ in relation to $\lambda_i Q_i - d = \lambda'_i Q'_i - d'$, where $$Q_i = \frac{P_i}{\|P_i\|}\left(P_i = S^{-1} \cdot \begin{bmatrix} p_i \\ 1 \end{bmatrix}\right)$$

and $d=S^{-1}\cdot s$ and $d'=S'^{-1}\cdot s'$, with "S" and "s" both representing portions of a respective projection matrix defining projections from the scene into one of the images, and "S'" and "s'" both representing portions of a respective projection matrix defining projections from the scene into the other of the images.

23. A system as defined in claim 21 in which the control point information generator module is configured to enable said computer to identify projections of one control point onto each of three images and generate the control point information coordinate information therefrom.

24. A system as defined in claim 17 in which said alignment information generator module is configured to enable said computer to generate said alignment information by using a Singular Value Decomposition (SVD) algorithm that fits sets of points $\{\lambda_i Q_i - d\}_{i=1}^n$, $\{\lambda'_i Q'_i - d'\}_{i=1}^n$ and $\{\lambda''_i Q''_i - d''\}_{i=1}^n$ to the control points $\{G_i\}_{i=1}^n$, where $$Q_i = \frac{P_i}{\|P_i\|}\left(P_i = S^{-1} \cdot \begin{bmatrix} p_i \\ 1 \end{bmatrix}\right)$$

and $d=S^{-1}\cdot s$, $d'=S'^{-1}\cdot s'$ and $d''=S''^{-1}\cdot s''$, with "S" and "s" both representing portions of a respective projection matrix defining projections from the scene into one of the images, and "S'" and "s'" both representing portions of a respective projection matrix defining projections from the scene into another of the images, and "S''" and "s''" both representing portions of a respective projection matrix defining projections from the scene into the third of the images.

* * * * *